Dec. 29, 1942. J. H. WILSON 2,306,418
VARIABLE SPEED TRANSMISSION
Filed Jan. 23, 1939 4 Sheets-Sheet 1

Inventor
John H. Wilson
Watson, Cole, Grindle & Watson
Attorney

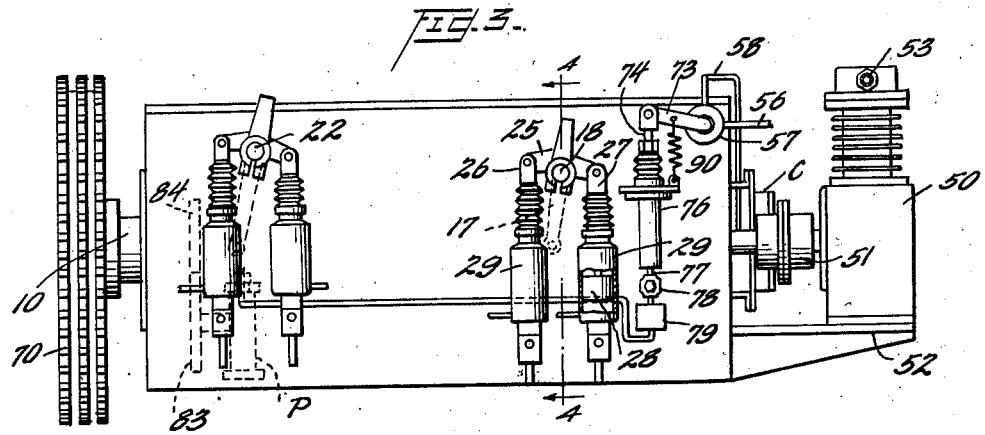
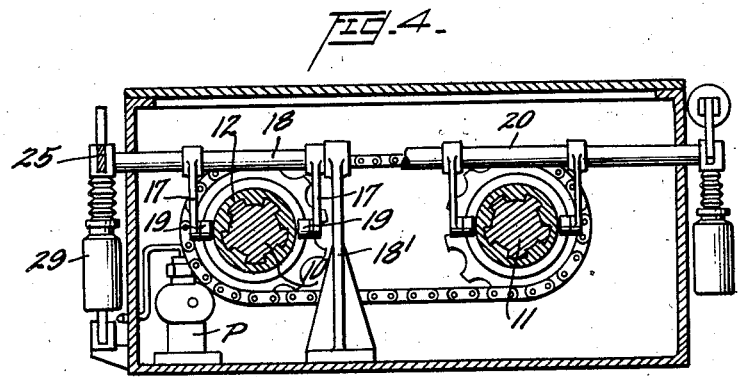
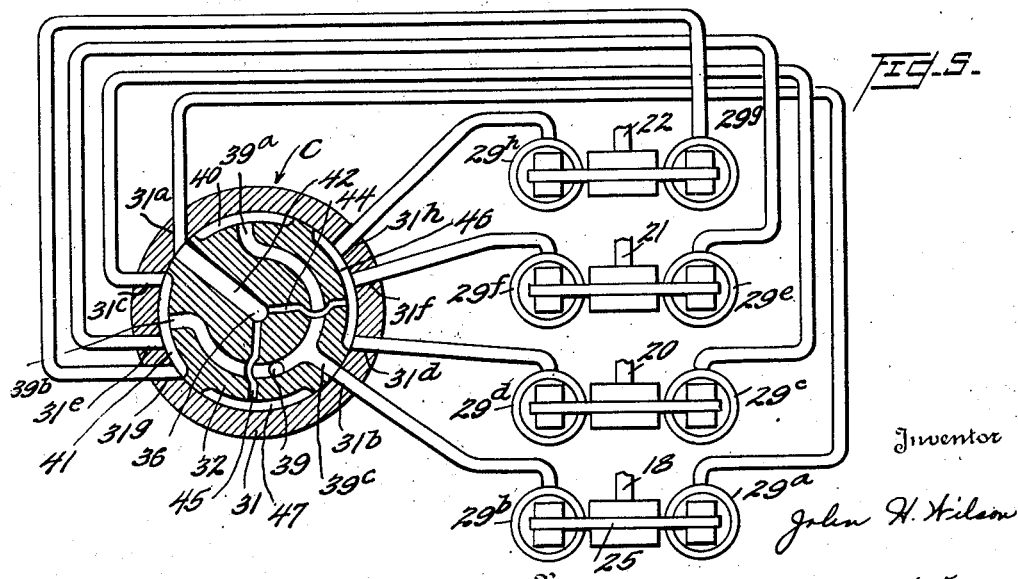

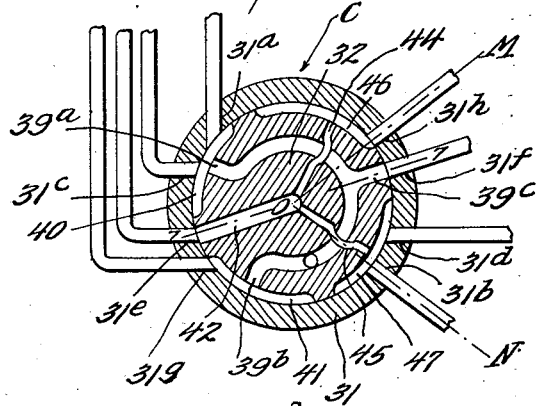
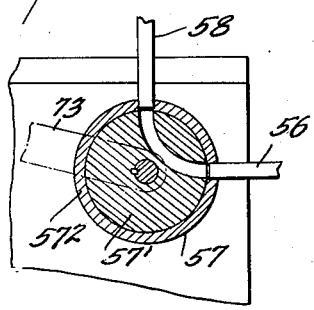
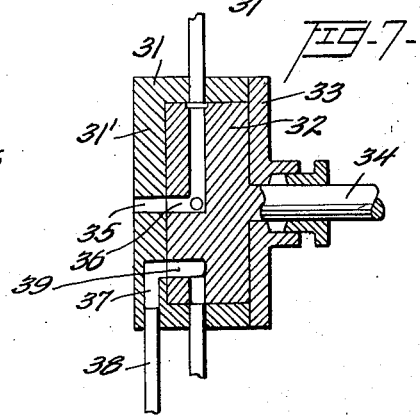
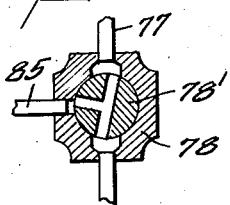
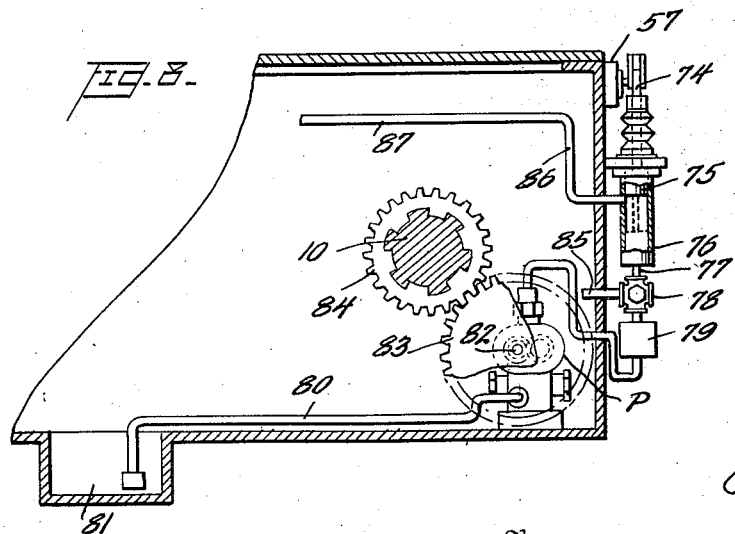

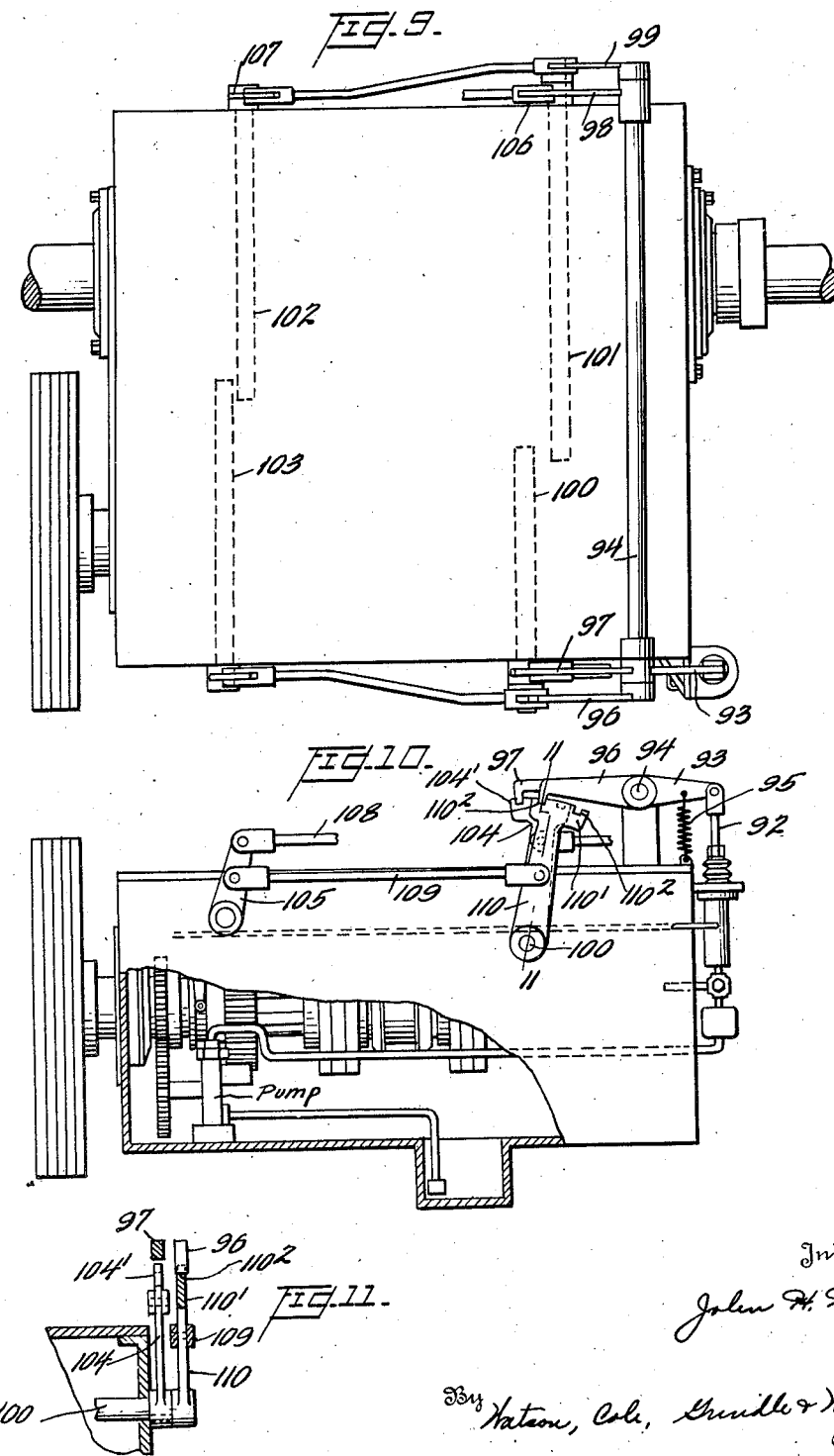

Patented Dec. 29, 1942

2,306,418

UNITED STATES PATENT OFFICE 2,306,418

VARIABLE SPEED TRANSMISSION

John Hart Wilson, Wichita Falls, Tex.

Application January 23, 1939, Serial No. 252,477

10 Claims. (Cl. 74—217).

This invention relates to variable speed transmissions and particularly to transmissions of the type including one or more clutches and power operated mechanisms for effecting actuation of the clutches to effect operative connection and disconnecting of spaced driving and driven shafts.

Numerous types of variable speed transmissions have been heretofore designed or suggested and such mechanisms are widely made use of in the industrial arts. Customarily a mechanism of this type is interposed between a prime mover, such for instance as an electric motor or gasoline engine, and a shaft or other mechanical element which is either to be driven at widely varying speeds or subjected to widely varying loads, thus requiring frequent changes in the mechanical driving ratio to insure that the prime mover is at all times operating within its capacity. Clutches are commonly made use of in such change speed mechanisms for the purpose of selectively connecting the driven shaft to the prime mover through different trains of gearing, these clutches being of either the positive or friction types. While certain variable speed mechanisms carry but light loads and the clutches incorporated therein are only infrequently operated, other types of such mechanisms are subjected to very severe usage, transmit heavy loads and, the clutches forming elements thereof are operated at very frequent intervals.

For instance the variable speed transmission widely used in the drilling of wells, the hoisting of tools and implements, and in the operation of pumps in the oil fields, is called upon at different times to operate or move devices which offer vastly different resistances to movement, and must be so constructed that it is easily possible to quickly connect to the prime mover any one of the several instrumentalities to be operated. The jaw clutch is commonly used in mechanisms of this character, being entirely free from slippage and being simple and long lasting. These jaw clutches are frequently of large size and great weight and hence difficult to shift manually. It is one object of the present invention to provide a novel and improved power means, or servo mechanism, for effecting movements of the several jaw clutches in changing driving ratios. The primary purpose of the present invention is to provide means which is applicable to any type of variable speed mechanism in which clutches are used, whether shifted manually or by power, which means acts at all times during the operation of the mechanism as an entirety to eliminate the possibility of injury to the clutch and other operating parts of the transmission due to operation of any clutch at a time when its operation would result in breakage or injury to any of the transmission elements.

It will be readily appreciated that a clutch, particularly a jaw clutch, may be injured or broken when engaged at a time when the driving or input shaft of a variable speed transmission is rotating at high speed, and while at the same time the output or other shaft to be operatively connected thereto is either at rest or is rotating at a relatively low speed. Sudden engagement of a clutch under such conditions very frequently results in its destruction. Careful and experienced operatives will of course be careful not to cause clutch engagement to be effected when there is a wide disparity in the speed of rotation of the driving or input shaft of a variable speed transmission and the shaft to be driven, particularly where there is a substantial load connected to the driven shaft and hence a large inertia to be overcome. However, many machines which include change speed transmissions come into the hands of and are operated by persons who are relatively unskilled in the care of such machines. Hence the desirability of providing a change speed transmission with a safety appliance of such character that injury to the transmission or any of its parts by reason of incorrect clutch manipulation is entirely prevented.

In accordance with this invention, such means is provided, the clutch or clutches of a variable speed transmission being rendered inoperative automatically whenever conditions are such that clutch engagement should not be attempted. Thus if the input shaft of the transmission, which may be directly driven by the prime mover, is rotating at too high an angular velocity with respect to the shaft to be driven, the clutch interposed in the driving connection between these shafts may not be operated and it is necessary for the operator to decrease the angular velocity of the input shaft either by disconnecting this shaft from the prime mover temporarily, or by slowing down the prime mover. The safety mechanism which I have designed, therefore, may be said to comprise or include an instrumentality which is responsive to changes in speed of the driving or input shaft of the transmission and also includes mechanism under the control of this speed responsive instrumentality for preventing operation of the clutches of the variable speed transmission under unfavorable conditions.

A preferred embodiment of the invention includes a fluid pump, such as an oil pump, operatively connected to the input shaft of the transmission and which delivers a stream of fluid from its discharge port which is proportional in volume to the speed of rotation of the input shaft, the higher the speed of rotation of this shaft the greater the rate of flow of fluid from the discharge port of the pump, and vice versa. Associated with the pump, and connected to its discharge port, is a pressure responsive element the position of which is determined by the rate of flow of the fluid through the discharge port of the pump. This pressure responsive element may be connected to the clutch operating means in various ways. For instance, when fluid pressure operated devices are employed to effect clutch operation, the pressure responsive element just referred to may actuate a valve to throw the pressure operated clutch manipulating system out of operation when the speed of the input shaft is too high for safe clutch engagement. Alternatively, the pressure responsive element may be connected to a mechanical means which is adapted to either directly engage a movable clutch part or to directly engage and lock against movement a manually operable clutch manipulating lever.

The essential elements of the safety mechanism just above briefly described may be varied substantially in design and arrangement in adapting the invention to variable speed transmissions of widely different types and constructions. Two embodiments of the invention will be hereinafter described, and are illustrated in the accompanying drawings, but it will be appreciated that these have been selected for disclosure by way of example only.

In the drawings:

Figure 3 is an end elevation of the transmission, as viewed from below, Figure 1;

Figure 4 is a section on line 4—4 of Figure 3;

Figure 5 is a schematic view of the fluid pressure means for effecting movement of the movable clutch members of the transmission, the control valve which comprises a part of this mechanism being shown in section;

Figure 6 is a further sectional view of the control valve, taken normally to the axis of rotation of the valve member, but showing this valve in a position different from that in which it is illustrated in Figure 5;

Figure 7 is a section on line 7—7 of Figure 6;

Figure 8 shows in side elevation the fluid pump which is operatively connected to the input shaft of the transmission and likewise shows in side elevation, partly broken away, the pressure responsive means which is connected to the discharge port of the pump;

Figure 9 shows in plan a transmission of the type illustrated in Figures 1 and 2 but in which manual means is provided to effect clutch operation;

Figure 10 is a side elevation, partly broken away, of this transmission as viewed from below, Figure 9, showing also the automatic clutch locking means;

Figure 11 is a section on line 11—11 of Figure 10;

Figure 12 is a section on line 12—12 of Figure 2; and

Figure 13 is a vertical section through a bypass valve which comprises an element of the mechanism.

Figure 1:
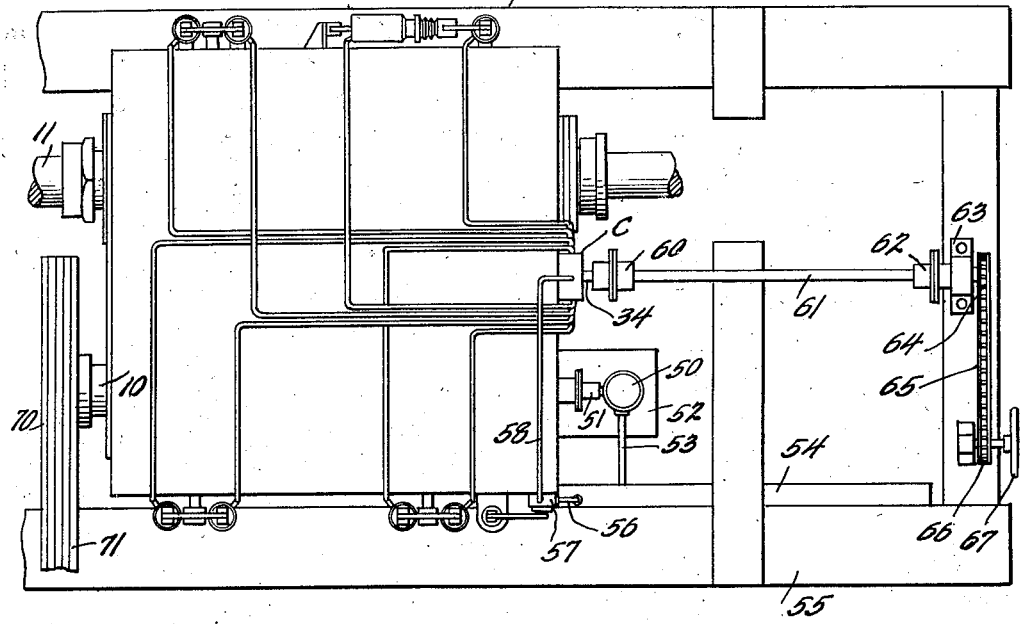
Figure 1 is a plan view of the casing of a variable speed transmission of the type which embodies power means for effecting clutch movement, showing portions of the clutch shifting means.

While, as previously stated, the invention may be applied to transmissions which vary widely in details of design, it may be made use of to great advantage in connection with a transmission such as that illustrated in the drawings. This transmission includes an input shaft 10, an output shaft 11 and a plurality of clutches and driving connections whereby the output shaft 11 may be driven from the input shaft in one direction at any one of three different speeds and may also be driven in the reverse direction. The details of construction of the various shafts, sprockets and power transmitting chains, form no part of the present invention and need not be specifically described. A precise disclosure of these various parts and their manner of operation is to be found in my co-pending application for patent, Serial No. 26,980, filed June 17, 1935, entitled "Drilling rig transmission." It is only necessary here to say that the transmission embodies four movable clutch elements, three of which, indicated at 12, 13 and 14, are of the jaw type, that indicated at 12 being splined on the input shaft 10 of the transmission and those indicated at 13 and 14, respectively, being splined upon the output shaft 11. The clutch which includes the sliding jaw 12 may be designated the high speed clutch, that which includes the sliding clutch member 13 being the low speed clutch and the intermediate speed clutch including the movable jaw 14. The numeral 15 indicates a gear splined on input shaft 10 which may be shifted longitudinally along that shaft to effect engagement of its teeth with those of a gear 16 to connect the input and output shafts for reverse rotation of the output shaft. Broadly speaking, the two gears 15 and 16 comprise complementary clutch members.

Associated with each movable clutch member is a clutch operating or shifting yoke comprising parallel arms projecting downwardly from a rock shaft above the shiftable clutch element, the lower ends of each such arm provided with a clutch operating roller. In Figure 4 of the drawings parallel arms 17 are shown to have their upper ends fixed on rock shaft 18 disposed above and extending transversely of input shaft 10 and directly overlying the shiftable clutch member 12, the rollers 19 carried by the lower ends of arms 17 lying in an annular groove formed in the slidable clutch member. Rocking movement of rock shaft 18 about its longitudinal axis therefore results in movement of clutch jaw 12 longitudinally along shaft 10. Similar rock shafts, indicated at 20 and 21 in Figure 2 overlie the shiftable clutch jaws 13 and 14, respectively, and are similarly connected to these sliding jaws, respectively. A fourth rock shaft 22 overlies the slidable gear 15 and is likewise operatively connected to this gear by depending arms comprising a yoke so that by rocking shaft 22, gear 15 may be moved into engagement with gear 16, or may be withdrawn from engagement with this gear, gear 16 being mounted for rotation about a fixed axis and not slidable.

Figure 2:
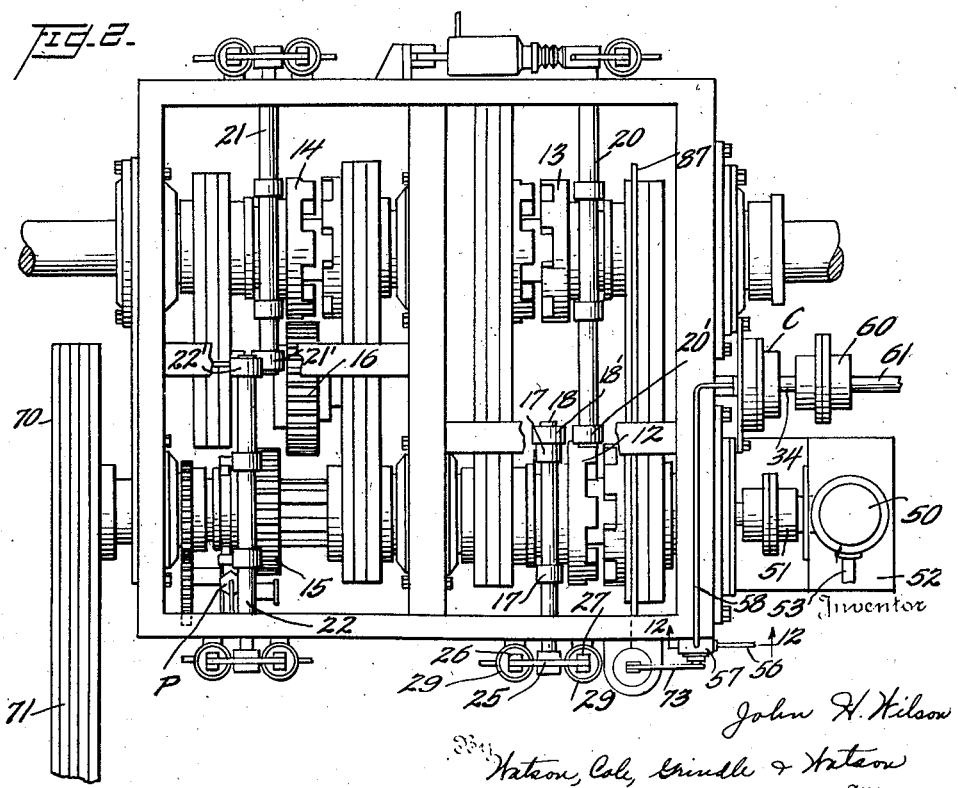
Figure 2 is a plan view of the transmission, the cover plate of the casing having been removed to show the various operating parts.

The several rock shafts 18, 20, 21 and 22 may be supported for rocking movement in any suitable fixed bearings. In Figure 2 of the drawings each is shown to be supported at its inner end upon a fixed bearing rigid with the transmission casing, these several bearings being indicated at 18', 20', 21' and 22', and the other end of each of these shafts is rotatably supported in a bearing formed in the adjacent vertical side walls of the casing, the outer ends of the several rock shafts projecting beyond these bearings so as to be accessible from without the casing. Fixed on the outer end of rock shaft 18 so as to be rotatable therewith is a two-armed lever 25, and pivotally connected to the outer ends of the arms of this lever are the upper ends of rods 26 and 27 each of which extends downwardly from its point of pivotal connection in a substantially vertical direction and each of which is connected at its lower end to a piston, one such piston being indicated at 28 in Figure 3. The two pistons are respectively enclosed within parallel cylinders 29 secured to the side of the transmission casing and fluid may be introduced into each such cylinder through a port formed in the lower end of the cylinder, or below the lowermost point of possible travel of the associated piston, fluid, for instance air, being led to these inlet ports through suitable conduits provided for this purpose. By introducing fluid under pressure into the lower end of one cylinder 29 and by simultaneously venting the associated cylinder, one piston may be driven upwardly and the other allowed to move downwardly, thus effecting rocking movement of rock shaft 18 in one direction or another as desired, depending on which way it is desired to move the movable clutch member which is operatively connected to the rock shaft. All of the rock shafts are provided with similar or equivalent fluid actuated rocking means, all of which need not therefore be specifically described.

In the diagrammatic Figure 5 of the drawings portions of the several rock shafts 18, 20, 21 and 22 are illustrated in part and the motive fluid receiving cylinders associated with these rock shafts, respectively, are also shown in plan, these cylinders being designated 29a, 29b, 29c, 29d, 29e, 29f, 29g and 29h for the purpose of identifying them in a description of the operation of this mechanism. The cylinders 29b, 29d, 29f and 29h will be hereinafter designated the engaging cylinders since, when one of these cylinders is supplied with motive fluid, the associated rock shaft is rocked in such direction as to effect engagement of the clutch to which it is connected. The cylinders 29a, 29c, 29e and 29g are designated disengaging cylinders since when any one of these cylinders is supplied with fluid under pressure the associated rock shaft is rocked in the reverse direction, i. e., to effect disengagement of the clutch to which it is connected. Each of the eight cylinders may either be connected to a source of motive fluid, for instance air under pressure, or brought into communication with the atmosphere, by means of the arrangement of conduits shown and the valve device generally indicated at C. This valve may be formed in various ways, for instance in the manner diagrammatically illustrated, having a cylindrical casing 31 which encircles a cylindrical valve 32. The valve casing 31 is cup-shaped as indicated in Figure 7, having a back plate 31' integral with its cylindrical wall and likewise includes a cover plate 33 axially apertured for the reception of a shaft 34 by means of which rotary movement of valve 32 may be effected. A port 35 is formed in the rear plate 31' of the valve casing and axially of the valve member 32, this port being a fluid exhaust port and being in constant register with the axially disposed exhaust port 36 of valve 32.

A second port 37 formed in the back plate 31 of the vlave casing is in constant communication with a source of fluid under pressure, for instance compressed air, through duct 38 and the inner end of port 37 is likewise in constant register with duct 39 formed in valve 32.

The cylindrical wall of valve casing 31 is further provided with eight additional ports arranged in groups of four, the first group of ports being indicated at 31b, 31d, 31f and 31h and the second group at 31a, 31c, 31e and 31g. The valve ports of the first group just mentioned are in constant communication with the lower ends of the clutch engaging cylinders 29b, 29d, 29f and 29h, suitable conduits being provided for this purpose, and the valve ports of the second group, i. e., 31a, 31c, 31e and 31g are in constant communication with the lower ends of cylinders 29a, 29c, 29e and 29g, respectively, as shown. The valve operating mechanism is so designed and constructed that the valve may be rocked through an angle of approximately 90° and the valve ports are so formed and disposed as to supply motive fluid to one only of the engaging cylinders 29b, 29d, 29f or 29h at any one time, simultaneously, however, supplying air under pressure to the three non-corresponding disengaging cylinders. Also, in this position of the valve three of the clutch engaging cylinders are in communication with the exhaust, the general purpose being to effect positive engagement of one clutch and to insure complete disengagement of the other three.

In Figure 5 the valve is shown to be turned to a position to supply motive fluid to the engaging cylinder 29b, to effect engagement of the clutch to which rock shaft 18 is connected and also to supply motive fluid to the disengaging cylinders 29c, 29e and 29g so that the rock shafts 20, 21 and 22 are, respectively, positively urged to the limits of their movements in clutch disengaging direction. By means of this arrangement the transmission is safeguarded since it is impossible for an operator, no matter how careless, to engage more than one clutch at any one time.

While, as has been previously stated, various types of valves may be designed for thus controlling the inflow and exhaust of motive fluid, that which is illustrated may advantageously be made use of. The port 39 which is in constant register with the port 37 for all positions of the valve, so as to be in constant communication with the supply of motive fluid, has a circularly curved portion terminating in radially disposed end 39a and 39b and likewise has a radially extending intermediate branch 39c. The terminal branches 39a and 39b of port 39 communicate with circumferentially extending recesses 40 and 41, respectively, formed in the cylindrical outer face of the valve member 32. The radially extending branch 39c terminates in a circular port formed in the valve face. A radially disposed exhaust port is indicated at 42, this port extending from the face of the valve member inwardly to its axis where it communicates with the axially extending port 36 previously referred to. Additional radially extending exhaust ducts are indicated at 44 and 45, the inner ends of these ducts likewise being in communication with the axially extending duct 36. The outer end of duct 44, however, is in communication with the circumferentially elongated recess 46 formed in the valve face and the outer end of duct 45 likewise being in communication with a similarly formed and disposed recess 47.

The valve member 32 may be revolved to bring the compressed air duct port 39c into register with any one of ports 31b, 31d, 31f or 31h, as desired. The exhaust duct 42, which is diametrically opposed to port 39c will simultaneously be brought into register with one of the ports 31a, 31c, 31e or 31g. With the valve positioned as shown in Figure 5, therefore, air under pressure is being supplied to the engaging cylinder 29b and also to the disengaging cylinders 29c, 29e and 29g so that the clutch connected to rock shaft 18 is engaged and the clutch connected to the other three rock shafts is disengaged. Likewise the engaging cylinders 29d, 29f and 29h are in communication with the exhaust, as well as the disengaging cylinder 29a so that the pistons in these cylinders may freely fall. By rotating the valve member 32 to other positions, one of which is indicated in Figure 6, any one clutch may be engaged and the other three fully disengaged. The valve operating mechanism is provided with limiting stops so that the valve may be only operated through a relatively small angle, movement of the compressed air discharge duct 39c for instance being only possible through the angle indicated at M, O, N in Figure 6.

An air compressor for supplying the motive fluid for clutch operation is indicated at 50 in the drawings, this air compressor being connected by means of a universal coupling 51 to one end of the transmission input shaft 10 and being suitably supported upon a platform 52 rigid with the transmission casing. The air compressor is in operation, therefore, at all times when the transmission is in use. From the compressor air under pressure is led through a duct 53 to a storage tank 54 mounted upon the base upon which the mechanism is supported, which base is indicated at 55. From tank 54 leads a compressed air offtake duct 56 the discharge end of which is secured to the casing of a valve 57 for interrupting the flow of air from the tank 54, under certain conditions. A further duct 58 leads from valve 57 to the port 37 in the casing 31 of the control valve 32.

As will be observed in Figure 1, the control valve operating shaft 34 is connected by means of a universal joint 60 to a rotatable operating shaft 61 which shaft is connected at its opposite end through a universal joint 62 to a short shaft carried in a fixed bearing 63 and having secured on its outer end a sprocket 64. Sprocket 64 is connected by means of a chain 65 with a sprocket 66 which is adapted to be manually rotated about a fixed axis by means of a hand wheel 67 or the like. Hence, so long as valve 57 does not interrupt the flow of compressed air from the tank 54 to the control valve this control valve will be effective in controlling the flow of motive fluid for clutch operation and an operator can readily shift clutches as he desires by manipulating the hand wheel 67.

However, as previously explained, great damage might be done to the transmission if an attempt be made to engage a clutch while the input shaft 10 is rotating at high angular velocity. It may be stated that the input shaft has secured to the end thereof remote from the compressor 50 a sprocket or pulley 70 which sprocket or pulley is operatively connected to a prime mover through chains or belts 71. The prime mover itself is not illustrated but it will be understood that it may comprise a motor, steam engine, or one or more internal combustion engines. The driving connection between the prime mover and the transmission includes a clutch by means of which this driving connection may be interrupted for instance a clutch disposed in the manner shown in my copending application previously referred to and a conventional braking means is also preferably employed in association with the prime mover by means of which it may be rapidly decelerated when desired. In any event the air flow cut-off valve 57 is intended to be moved to closed position when the speed of the input shaft 10 is undesirably high, to render the clutch actuating mechanism inoperative. Movements of the valve 57 are automatically effected by means the operation of which is in turn controlled by the input shaft 10 so that, when the input shaft 10 is rotating at a speed above a predetermined speed valve 57 closes and will not reopen, to render the clutch operating mechanism operative, until the speed of rotation of this shaft is reduced. It is thus made necessary for the operator to either slow down the prime mover in some suitable manner, or to otherwise reduce the angular velocity of shaft 10 to a predetermined maximum before the clutch operating mechanism can be called into action.

The means for effecting the automatic closure and opening of valve 57 will now be described. While the valve 57 may be of any conventional type, the ported valve part which it includes is preferably cylindrical, as indicated at 57', and enclosed within a cylindrical casing $57^2$ as shown in Figures 3 and 12. To the movable valve part 57' is rigidly secured an arm 73 this arm being operatively connected as by means of a pin and slot type of connection, to the upper end of a piston rod 74, the lower end of which is secured to a piston 75 slidable in a vertically disposed cylinder 76 attached to the side of the transmission casing. Oil under pressure may be introduced into cylinder 76 through a port in its bottom, the numeral 77 indicating an oil duct leading downwardly from this port, through a by-pass valve 78, and through an oil filter 79, to the discharge port of an oil pump generally indicated at P which is located within the transmission casing and supported upon the bottom wall of this casing as shown in Figure 3. A duct 80 leads from an oil sump 81 formed in the bottom wall of the casing, to the inlet port of the pump P.

Advantageously the pump may be of the gear type. An axial extension 82 of one of the two intermeshing gears of the pump projects through an aperture formed in the side wall of the pump casing. Upon this projecting spindle 82 is fixed a gear 83 the teeth of which mesh with those of a gear 84 fixed upon the input shaft 10 of the transmission. It will therefore be observed that the pump will be operated by power derived from the input shaft 10 and it follows that the fluid output of the pump will increase as the speed of the shaft 10 increases and fall as the speed of shaft 10 decreases, in direct relationship.

The casing of the by-pass valve 78 is provided with a discharge duct 85 which extends through an aperture in the side wall of the transmission casing. A duct 86 likewise leads from a discharge port in a wall of cylinder 76 through the side wall of the transmission casing to a spray pipe 87 or a series of spray pipes overlying the various clutches and transmission chains so that, in the event that the piston 75 is elevated by oil pressure to such extent that it uncovers the port in the cylindrical wall which communicates with duct 86, oil will enter the spray pipes 87 and be sprayed onto the operating parts of the transmission, finally returning to the sump.

At all times while the input shaft 10 is in operation the pump P will be likewise in operation and will be pumping oil upwardly through the filter 79 to the adjustable by-pass valve 78. The adjustable valve member 78' of this valve is so adjusted that a certain amount of the oil being pumped will escape through duct 85 and thus return to the transmission casing. If the input shaft 10 is rotating at a relatively low velocity the stream of oil delivered by the pump will escape entirely through the by-pass duct 85 and the piston 75 will remain in its lowermost position. Should the speed of operation of input shaft 10, however, be excessive oil will be delivered by the pump in too great volume to make its escape entirely through the by-pass and this excess oil will pass upwardly toward and enter the cylinder 76 thus raising the piston 75 against the action of gravity and of the spring 90 which normally tends to draw arm 73 and piston rod 74 downwardly. After the piston has moved upwardly a certain distance, carrying with it the arm 73 the valve 57 will close, thus rendering the clutch shifting mechanism inoperative. If the speed of the input shaft is so great that the piston 75 is elevated to the position in which it is shown in full lines in Figure 8, the excess amount of oil delivered may escape through the duct 86 and spray pipe 87 thus lubricating the operating parts of the transmission. By adjusting the position of the adjustable valve member 78' of the by-pass valve 78 it is possible to insure that the air cut-off valve 57 will be closed at any predetermined speed of rotation of the input shaft 10, as will be apparent.

In Figures 9 and 10 of the drawings a substantially identical arrangement of pump, by-pass and oil pressure responsive piston is illustrated but in this instance the piston, instead of being connected to an air cut-off valve such as the valve 57, has its piston rod, indicated at 92, connected to an arm 93 fixed upon a rock shaft 94, a spring 95 normally tending to rotate arm 93 and rock shaft 94 in a clockwise direction, and to depress the piston. Also fixed on rock shaft 94 are four horizontally extending arms, indicated at 96, 97, 98 and 99, respectively, each of these arms being provided with a downwardly projecting tooth at its free end, as indicated in Figure 10. The several clutch operating rock shafts are indicated at 100, 101, 102 and 103 and upon the outwardly projecting outer end of each of these shafts is rigidly mounted a vertically extending shaft operating lever, two of these levers being shown in side elevation in Figure 10 and being indicated at 104 and 105, respectively. The other levers, upon the opposite side of the transmission are indicated respectively at 106 and 107.

Lever 105 is connected by a link 108 to an operating handle (not shown) and by a link 109 to a rocker 110 mounted upon the projecting end of rock shaft 100 for free rocking movement in a vertical plane. At its upper end rocker 110 is enlarged, as at 110', the enlargement being in the form of a segment and having two notches 110² formed therein, both being adapted to receive the downwardly projecting tooth of lever 96. When the clutch jaw associated with rock shaft 103 is fully engaged one notch 110² directly underlies the tooth of lever 96 and when it is fully disengaged the second notch underlies this tooth. Whenever, therefore, the speed of the input shaft of the transmission is higher than a predetermined speed the rock shaft 94 is revolved in a counter-clockwise direction by upward movement of piston rod 92 and either one notch or the other is engaged by the tooth of locking lever 96, the lever 105 and rock shaft 103 being also locked against movement because of the link 109.

Likewise the lever 104, which is fixed on rock shaft 100, has a segmental notched enlargement 104' at its upper end which directly underlies the toothed end of locking lever 97. When lever 96 rocks downwardly to engage segment 110' the locking lever 97 simultaneously engages and locks segment 104' and hence locks lever 104 and rock shaft 100. Rock shafts 101 and 102 are simultaneously locked against movement, by similar means, (including locking levers 98 and 99) and thus all four of the clutches are mechanically locked against movement when the speed of rotation of the transmission input shaft is too high and simultaneously released or unlocked when the speed is sufficiently reduced.

Other types of means may be devised for rendering the clutch operating means inoperative when the input shaft of the transmission is rotating at too high a speed to permit safe clutch engagement, to suit various types of transmissions, all within the import of the invention. Naturally speed responsive devices may be energized or driven by some shaft other than the transmission input shaft if desired, provided that safety of clutch engagement is realized.

Having thus described the invention, what is claimed as new and desired to be secured by Letters Patent is:

1. In combination, driving and driven elements, a clutch for operatively connecting and disconnecting said elements, a clutch actuating member movable to and from clutch engaging and disengaging position, and mechanism for preventing engagement of the clutch when one of said elements is rotating at a greater than a predetermined speed, said mechanism including a fluid pump operatively connected to one of said elements so as to be driven thereby at a speed proportional to the speed of said element, a member adapted to engage and lock said clutch actuating member against movement, and a device for receiving fluid from said pump and actuating said locking member to lock said clutch when the pressure of the fluid delivered by the pump exceeds a predetermined amount.

2. In combination, driving and driven elements, a clutch for operatively connecting said elements, a member connected to the clutch and adapted to be actuated by super-atmospheric fluid pressure to engage and disengage said clutch, a source of super-atmospheric fluid pressure, and fluid pressure operated means for rendering said clutch actuating member inoperative when the speed of rotation of one of said elements is greater than a predetermined speed, said last mentioned means including a second fluid pump operatively connected to said element.

3. In combination, driving and driven elements, a clutch for operatively connecting said elements, a member connected to the clutch and adapted to be actuated by super-atmospheric fluid pressure to engage and disengage said clutch, a fluid pump operatively connected to the driving element to be driven thereby and to provide said super-atmospheric pressure, a pressure tank connected with said pump, a conduit connecting said tank with said member, a valve in said conduit and fluid pressure operated means for closing said valve and rendering said clutch actuating member inoperative when the speed of rotation of the driving element is greater than a predetermined speed, said last mentioned means including a second fluid pump also operatively connected to the driving element.

4. A transmission comprising a casing, driving and driven elements, means including a clutch connecting said elements, means for recovering oil from the bottom of the casing and delivering it through a conduit into a receptacle at a pressure substantially proportional to the speed of rotation of the driving element, a receptacle for receiving said liquid and having a part displaceable under fluid pressure, an overflow conduit opening into said receptacle at a point normally covered by said displaceable part, but uncovered when said part moves to its shifted position for leading oil from said receptacle back into the casing, clutch operating means, and mechanism associated with said part for rendering said clutch operating means inoperative when a greater than a predetermined flow of oil passes into said receptacle to displace said part.

5. A transmission comprising a casing, driving and driven elements, means including a clutch connecting said elements, means for recovering oil from the bottom of the casing and delivering it through a conduit into a receptacle at a pressure substantially proportional to the speed of rotation of the driving element, a receptacle for receiving said liquid and having a part displaceable under fluid pressure, an overflow conduit opening into said receptacle at a point normally covered by said displaceable part, but uncovered when said part moves to its shifted position for leading oil from said receptacle back into the casing, clutch operating means, and mechanism associated with said part for rendering said clutch operating means inoperative when a greater than a predetermined flow of oil passes into said receptacle to displace said part, said overflow conduit leading to various operating parts of the transmission to supply lubricant thereto.

6. In combination, driving and driven elements, a clutch for operatively connecting and disconnecting said elements, two fluid pressure responsive devices operatively connected to said clutch for respectively engaging and disengaging the same, conduits for alternatively leading fluid under pressure to said devices to effect said engagement and disengagement, a valve for controlling the flow of pressure fluid through said conduits, a master valve for cutting off the supply of fluid pressure to both of said conduits, and means associated with one of said elements for closing the latter valve when the said element is rotating at a greater than a predetermined speed.

7. A variable speed transmission comprising a casing, driving and driven shafts, a plurality of means for operatively connecting said shafts for driving said driven shaft at different speeds, a fluid pressure actuated means for operating each of said first named means, a source of fluid pressure, a supply conduit leading from said source, a plurality of conduits leading to said fluid pressure actuated means, a control valve having a casing with which all of said conduits are adapted to communicate, a valve body in said casing so constructed and arranged as to place any one of said second named conduits in communication with said first named supply conduit to the exclusion of all of the others, a valve in said supply conduit adapted to cut off the flow of pressure fluid to said first named valve, and means associated with said driving shaft for closing said second named valve when the driving shaft is rotating at a greater than a predetermined speed.

8. A variable speed transmission comprising a casing, driving and driven shafts therein, gearing for operatively connecting said shafts for driving said driven shaft at different speeds, a plurality of clutches for selectively actuating said gearing to attain said speeds, actuators for each of said clutches, each adapted to move the clutch with which it is associated to and from engaged position, a fluid pressure device operatively connected with each actuator to move it to clutch engaging position, and a fluid pressure device operatively connected with each actuator for moving it to clutch disengaging position, a conduit leading to each of said fluid pressure devices, a source of fluid pressure, a supply conduit leading from said source, a control valve having a casing with which all of said conduits are adapted to communicate, a valve body in said casing so constructed and arranged as to place any one of said clutch engaging fluid pressure devices in communication with said supply conduit to cause said device to move its clutch actuator into engaging position and at the same time place the clutch disengaging devices associated with the other actuators in communication with said supply conduit, a master valve in said supply conduit, and means associated with said driving shaft for closing said valve and thus locking said actuators against movement when said driving shaft is rotating at greater than a predetermined speed.

9. In combination, driving and driven elements, a clutch for operatively connecting and disconnecting said elements, a clutch actuating member movable to and from clutch engaging and disengaging position, fluid pressure operated means for rendering said clutch actuating member inoperative when the speed of one of said elements is greater than a predetermined speed, means for actuating said fluid pressure operated means comprising a pump of the positive displacement type, and means for driving said pump at a speed proportional to that of said element.

10. A variable speed transmission unit suitable for transmitting rotary motion at relatively low speeds, comprising a casing, driving and driven shafts therein, gearing for operatively connecting said shafts for driving said driven shaft at different speeds, a plurality of clutches for selectively actuating said gearing for attaining said speeds, actuators for each of said clutches, each adapted to move the clutch with which it is associated to and from engaged position, means operatively connected with each actuator to move it to clutch engaging position, a fluid pressure means for preventing the operation of said first named means when the driving shaft is rotating at a greater than a predetermined speed, said means including a pump of the intermeshing gear type operatively connected to said driving shaft to be driven at a speed proportional to the speed of said shaft, fluid connections on said pump whereby oil may be recovered from the casing and supplied to operate said fluid pressure means under pressures proportional to the speed of said pump and said driving shaft.

JOHN HART WILSON.